United States Patent [19]

Osawa et al.

[11] Patent Number: 5,457,808
[45] Date of Patent: Oct. 10, 1995

[54] POINT-TO-MULTIPOINT COMMUNICATION NETWORK CAPABLE OF RETRANSMITTING A MULTICAST SIGNAL

[75] Inventors: Tomoki Osawa; Seiji Kachi, both of Tokyo, Japan

[73] Assignee: NEC Corporation, Tokyo, Japan

[21] Appl. No.: 12,931

[22] Filed: Feb. 3, 1993

[30] Foreign Application Priority Data

Feb. 4, 1992 [JP] Japan .................................. 4-018017
Sep. 11, 1992 [JP] Japan .................................. 4-242445

[51] Int. Cl.⁶ .................................................. H04B 7/14
[52] U.S. Cl. ................................ 455/8; 455/51.2; 455/69
[58] Field of Search ........................... 455/8, 9, 10, 12.1, 455/13.1, 13.2, 51.1, 51.2, 52.3, 63, 65, 69

[56] References Cited

U.S. PATENT DOCUMENTS

| | | | |
|---|---|---|---|
| 4,947,451 | 8/1990 | Nawata | 455/8 |
| 4,984,252 | 1/1991 | Morimoto | 455/8 |

FOREIGN PATENT DOCUMENTS

| | | |
|---|---|---|
| 56-96542 | 8/1981 | Japan . |
| 61-103339 | 5/1986 | Japan . |

OTHER PUBLICATIONS

T. Ohsawa et al.; Computer Mesh Network Using Satellite: Comnus–Its Application for Wide Area Data Network–pp. 1–11 with 15 pages of charts, drawings and photographs.

*Primary Examiner*—Edward F. Urban
*Assistant Examiner*—Philip J. Sobutka
*Attorney, Agent, or Firm*—Ostrolenk, Faber, Gerb & Soffen

[57] ABSTRACT

In a point-to-multipoint communication network wherein communication channels are established between a transmitting station and a plurality of receiving stations for transmission of data as a multicast signal, a reception confirming arrangement confirms reception of the multicast signal by the receiving stations to locate failing stations that fail to receive at least portions of the multicast signal. A retransmitting arrangement establishes relevant ones of the communication channels between the transmitting station and the failing stations for transmission of the portions to the failing stations. For reception confirmation, the data may be identified by data identifiers, as by a serial number. Alternatively, each receiving station may send back for comparison at the transmitting station a predetermined portion of datum which may be each of the data or a datum received latest at the receiving station under consideration. Preferably, the portions are retransmitted to the failing stations concurrently and one after another when the failing stations are and are not greater in number than a predetermined threshold value.

1 Claim, 12 Drawing Sheets

FIG. 5A
FIG. 5B
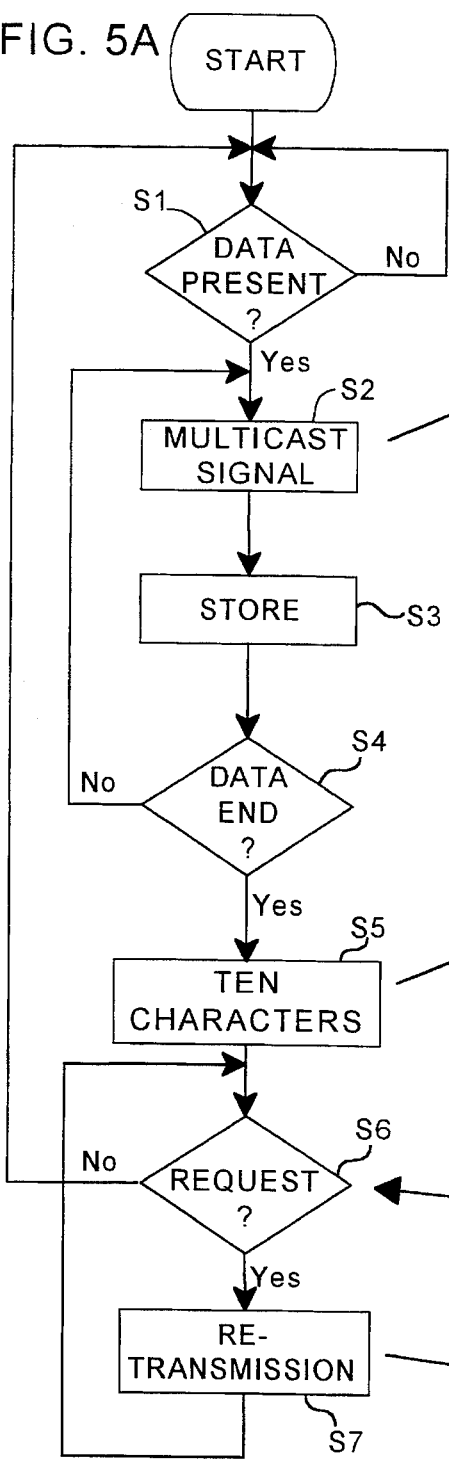
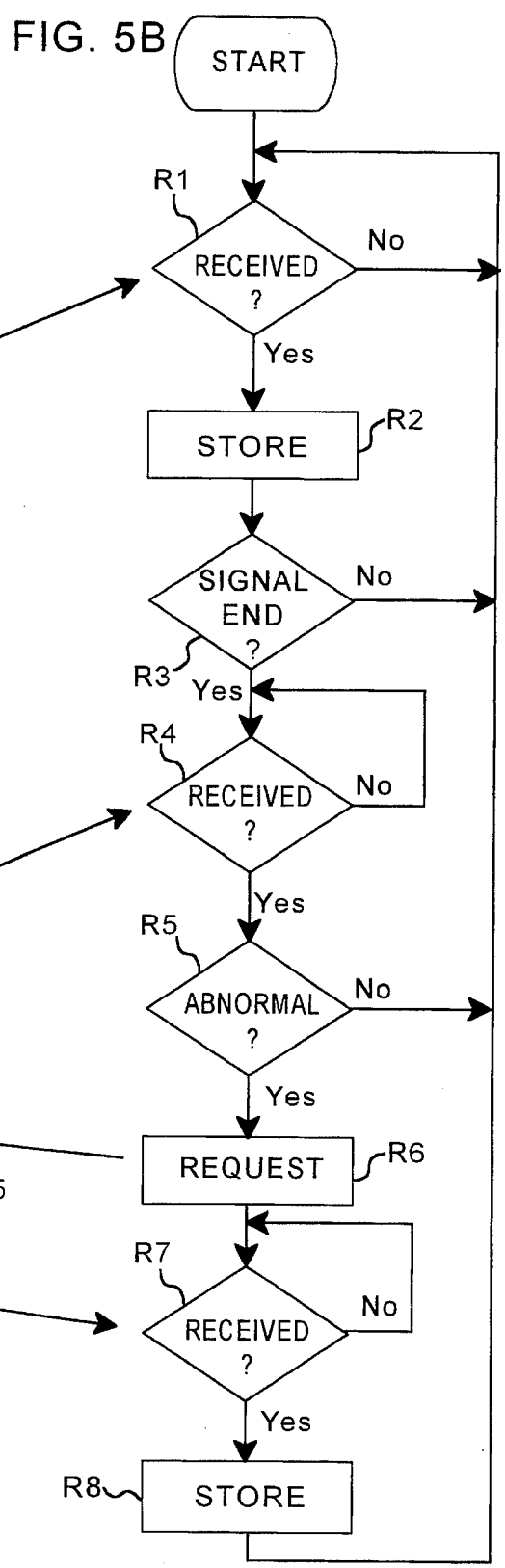

FIG. 6A
FIG. 6B
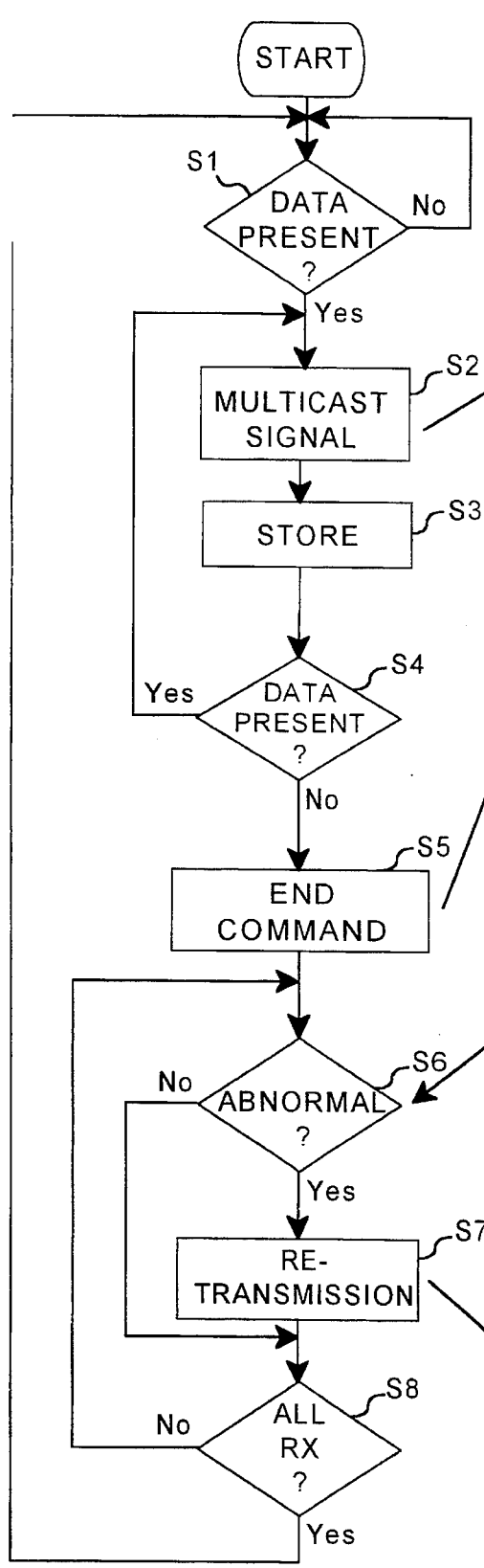
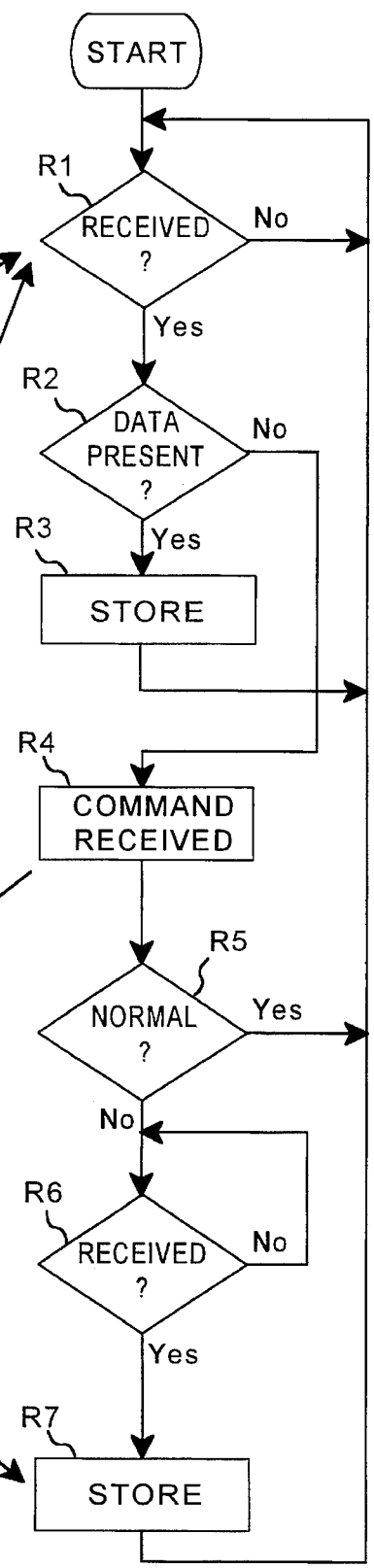

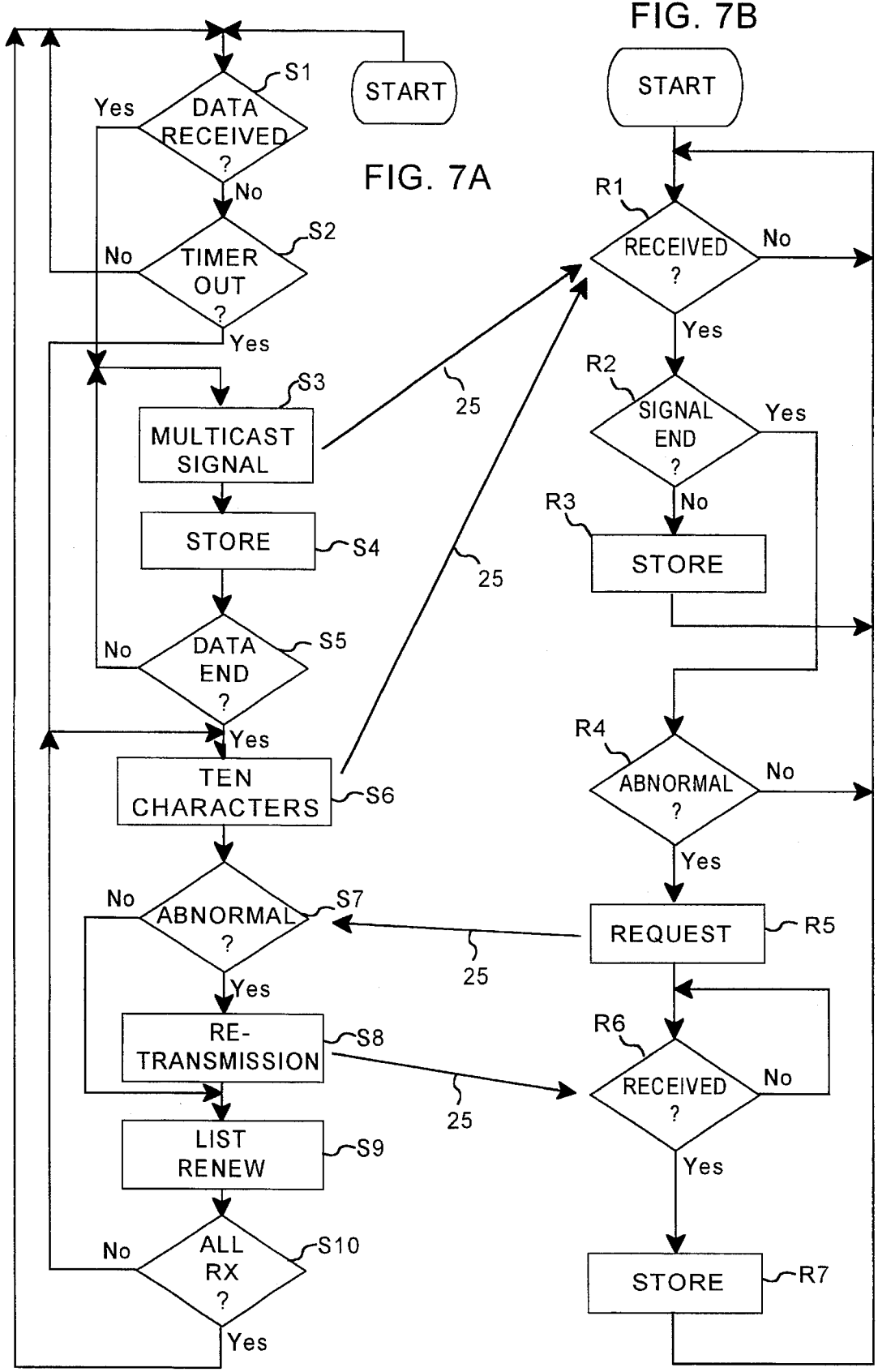

FIG. 8A
FIG. 8B
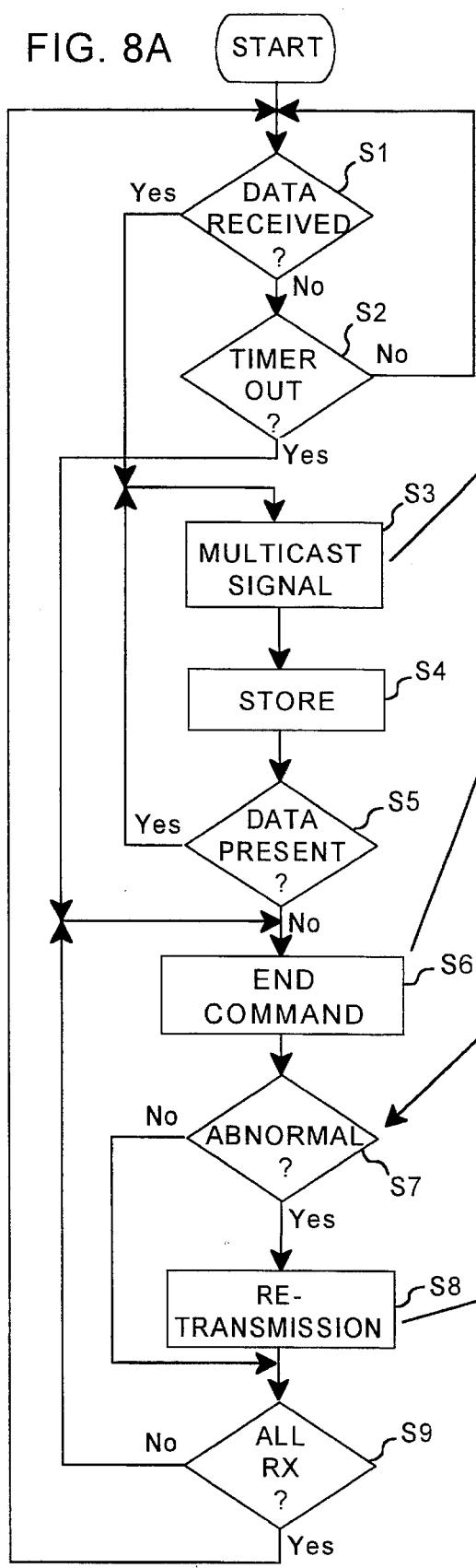
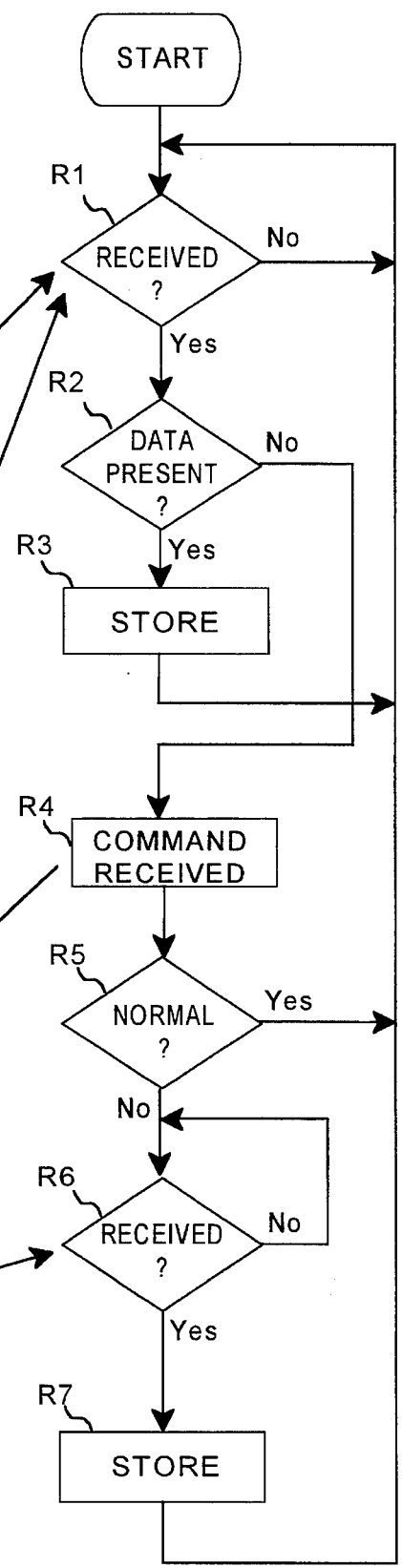

POINT-TO-MULTIPOINT COMMUNICATION NETWORK CAPABLE OF RETRANSMITTING A MULTICAST SIGNAL

BACKGROUND OF THE INVENTION:

This invention relates to a point-to-multipoint communication network, which is alternatively called a multicast communication network or otherwise.

Various point-to-multipoint communication networks are known. For example, a point-to-multipoint communication network is disclosed in Japanese Patent Prepublication (Kokai) No. 96,542 of 1981 for a Patent Application filed in Japan by International Business Machines Corporation based on a United States Patent Application which matured into U.S. Pat. No. 4,285,064 on Sep. 28, 1979. Another point-to-multipoint communication network is revealed in Japanese Patent Prepublication No. 103,339 of 1986. Still another point-to-multipoint communication network is described in a paper contributed by Tomoki Ohsawa and Seiji Kachi, the present joint inventors, and three others under the title of "Computer Mesh Network Using Satellite: COMNUS" to the COMSOC Technical Committee.

In the manner which will later be described more in detail, a point-to-multipoint communication network basically comprises a hub station and a plurality of satellite stations. The hub and the satellite stations are connected together by a communication medium which typically includes a transponder on board an artificial satellite.

The hub station may serve as a transmitting station and the satellite stations, as receiving stations. Data are transmitted as a multicast or broadcast signal from the transmitting station to the receiving stations through communication channels established through the communication medium. Receiving the multicast signal, each receiving station may send an acknowledgement signal back towards the transmitting station. The point-to-multipoint communication network therefore comprises a multicast communication arrangement for establishing the communication channels between the transmitting station and the receiving stations for use in transmission of the multicast signal.

It should be noted in this connection that the receiving stations are not always capable of correctly receiving the multicast signal. This is because a certain one of the receiving stations may be either still kept in an inoperative state or unexpectedly involved in trouble. In this manner, at least one of the receiving stations may be a failing or unsuccessful station that fails to duly receive the multicast signal.

It is possible for the transmitting station to confirm reception of the multicast signal by the receiving stations by receiving the acknowledgement signals from the receiving stations. It has, however, been impossible with a conventional point-to-multipoint communication network to administrate the failing station or stations and to again transmit the multicast signal to the failing station or stations.

SUMMARY OF THE INVENTION

It is consequently an object of the present invention to provide a point-to-multipoint communication network which comprises a transmitting station and a plurality of receiving stations and is for transmitting a multicast signal from the transmitting station to the receiving stations and which is capable of retransmitting at least a portion of the multicast signal from the transmitting station to a failing station that fails among the receiving stations to receive the portion.

Other objects of this invention will become clear as the description proceeds.

On setting forth the gist of this invention, it is possible to understand that a point-to-multipoint communication network includes a transmitting station, a plurality of receiving stations, and multicast communication means for establishing communication channels between the transmitting station and the receiving stations.

According to this invention, the above-understood point-to-multipoint communication network comprises: (A) reception confirming means for confirming reception of the multicast signal by the receiving stations to locate a failing station that falls among the receiving stations to receive at least a portion of the multicast signal: and (B) retransmitting means for establishing one of the communication channels between the transmitting station and the failing station and for transmitting the portion to this one of the communication channels.

On setting forth the gist of an aspect of this invention, it is possible to understand that a transmitting station is for use in a point-to-multipoint communication network in transmitting a multicast signal to a plurality of receiving stations and includes transmission control means for establishing a plurality of communication channels between the transmitting station and the receiving stations and for transmitting the multicast signal to the communication channels.

In accordance with this aspect of the invention, the above-understood transmitting station comprises: (A) reception confirming means for confirming reception of the multicast signal by the receiving stations to locate a failing station that fails among the receiving stations to receive at least a portion of the multicast signal and to send a failure signal to a pertinent one of the communication channels and (B) retransmitting means responsive to the failure signal for transmitting the portion to the pertinent one of the communication channels.

BRIEF DESCRIPTION OF THE DRAWING

FIG. 5 (comprising FIGS. 5A and 5B) shows a flow chart for use in describing operation of the point-to-multipoint communication network illustrated in FIG. 1;

FIG. 6 (comprising FIGS. 6A and 6B) shows another flow chart for use in describing operation of the point-to-multipoint communication network shown in FIG. 1;

FIG. 7 (comprising FIGS. 7A and 7B) shows still another flow chart for use in describing operation of the point-to-multipoint communication network depicted in FIG. 1;

FIG. 8 (comprising FIGS. 8A and 8B) shows yet another flow chart for use in describing operation of the point-to-multipoint communication network depicted in FIG. 1;

DESCRIPTION OF THE PREFERRED EMBODIMENT

Figure 1:
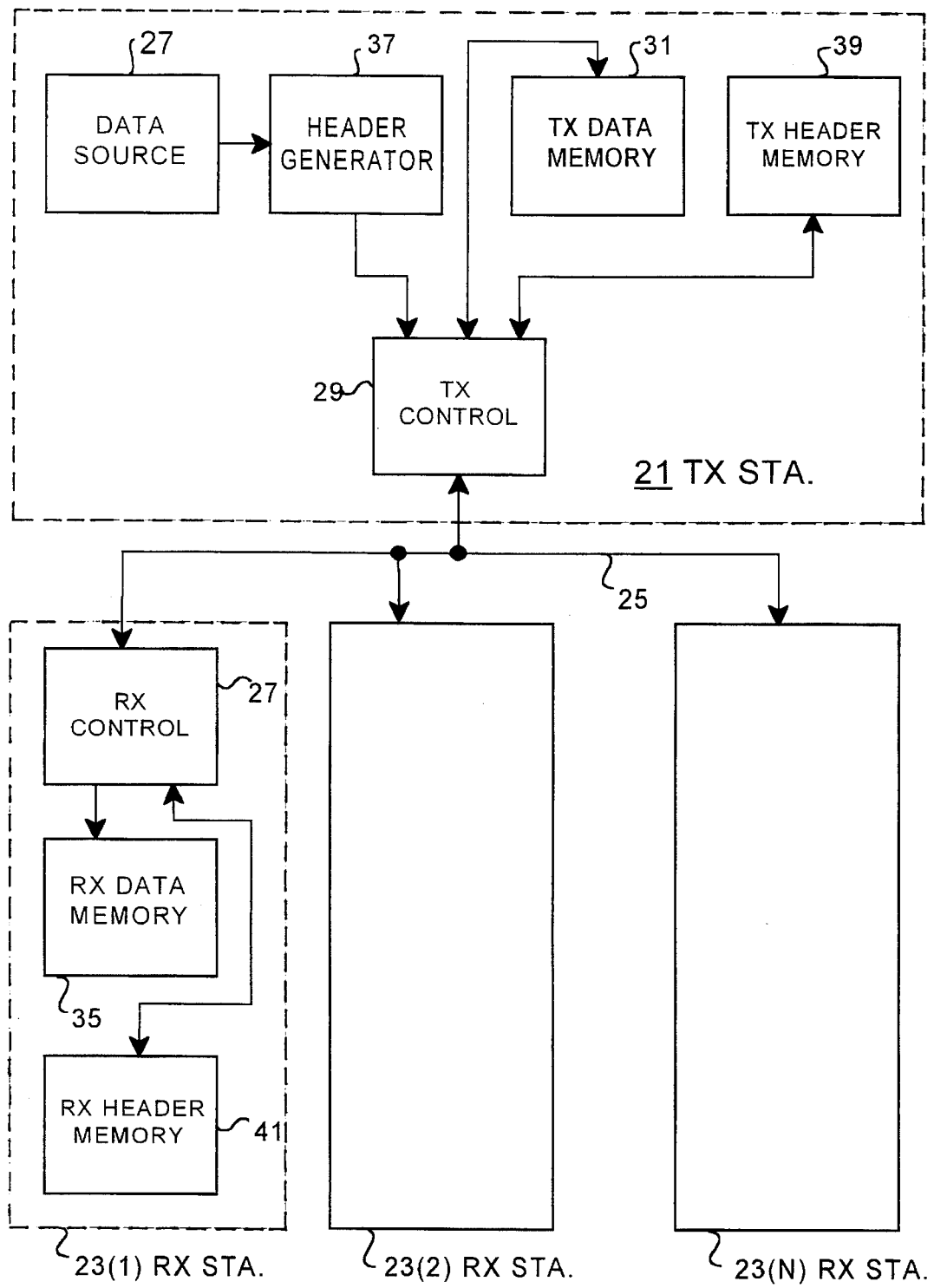
FIG. 1 is a block diagram of a point-to-multipoint communication network according to an embodiment of the instant invention.

Referring to FIG. 1, the description will begin with a point-to-multipoint communication network according to a preferred embodiment of the present invention. In the manner described heretobefore, the point-to-multipoint communication network is sometimes called a multicast communication network.

The point-to-multipoint communication network comprises a hub station 21 and first through N-th satellite-stations 23(1), 23(2), ..., and 23(N), where N represents a predetermined natural number, which depends on a scale of the point-to-multipoint communication network and may be equal to one hundred. The hub station 21 is connected to the satellite stations 23 (suffixes omitted) through a communication medium typically including a transponder (not shown) carried by an artificial satellite which may either be a communication satellite or a broadcast satellite.

Communication channels 25 are established between the hub station 21 and the satellite stations 23 through the communication medium. It will be surmised for the time being that the communication channels 25 are in a frequency band and are implemented by frequency dividing the frequency band. Through the communication channels 25, the hub station 21 transmits data to the satellite stations 23.

It will be assumed merely for brevity of the description that the data are transmitted only from the hub station 21 as a multicast or broadcast signal to the satellite stations 23 and that each of the satellite stations 23 sends only a response signal, such as an acknowledgement signal, back to the hub station 21. As a consequence, the hub and the satellite stations 21 and 23 are herein called a transmitting station and first through N-th receiving stations. The transmitting station will be designated by the reference numeral 21 and the first through the N-th receiving stations, either by the reference numerals 23(1) and so forth or collectively by the reference numeral 23.

It should be noted in connection with the foregoing that the receiving stations 23 are not always capable of correctly or duly receiving the multicast signal. It will be supposed that an n-th receiving station 23(n) is incapable of receiving the multicast signal, where n represents one of 1 through N, both inclusive. In other words, the n-th receiving station fails to receive at least a portion of the multicast signal. This may be because the n-th receiving station is either still kept in an inoperative state or unexpectedly involved in trouble. Stated otherwise, all the receiving stations 23 are not necessarily capable of receiving the data without fail. The n-th receiving station or a like receiving station is herein referred to as a failng or unsuccessful station.

Referring more particularly to FIG. 1, the transmitting station 21 comprises a data source 27 at which the data are generated. Supplied with the data in the manner which will presently be described in greater detail, a transmission control unit 29 is operable to primarily transmit the data as the multicast signal to the communication channels 25 in accordance with a protocol sequence which will become clear as the description proceeds. While transmitting the data as the multicast signal, the transmission control unit 29 stores the data in a transmission data memory 31 as memorized data.

Although depicted in the first receiving station 23(1) alone, each of the receiving stations 23 comprises a reception control unit 33 fox primarily receiving the data of the multicast signal as received data through a pertinent one of the communication channels 25. While receiving the data of the multicast signal, the reception control unit 33 stores the received data in a reception data memory 35 as reception data.

Having transmitted the data, the transmitting station 21 carries out reception or transmission confirmation according to the protocol sequence in cooperation with the receiving stations 23. It will now be presumed that the data are sequences of news items. When taken into consideration, one of the sequences will be called a particular sequence of news items.

Figure 2:
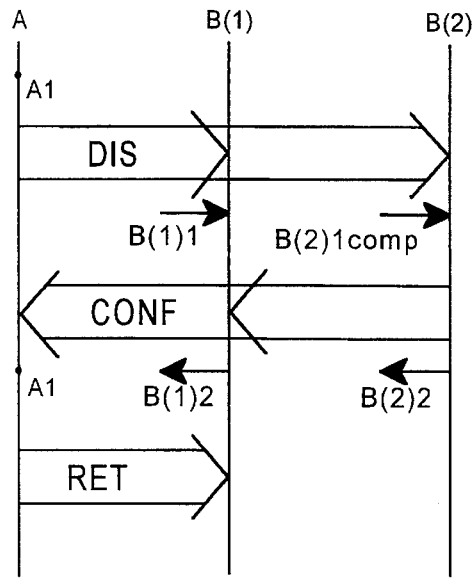
FIG. 2 shows a protocol sequence for use in the point-to-multipoint communication network illustrated in FIG. 1.

Referring to FIG. 2 with FIG. 1 continuously referred to, an example of the protocol sequece will be described together with other circuit elements of the transmitting and the receiving stations 21 and 23. The data source 27 successively generates the sequences of news items, each news item as a packet. Supplied with the sequences, a header generator 37 generates a header in connection with the particular sequence of news items. The header is for use in discriminating the particular sequence from others of the sequences and may represent the time of occurrence of the news (year, month, a day of the month, hour, minute, and second) and a news source.

As herein called, the header may be a series of headers which identify the news items of the particular sequence by serial item numbers. Such headers are attached to the news items of the particulaer sequence to provide transmission data. In the meantime, the headers are stored in a transmission header memory 39 as memorized headers with correspondence kept relative to the memorized data. In the manner described above, the transmission data are transmitted as the multicast signal to the communication channels 25.

In FIG. 2, the transmitting station (21) is indicated at A. Merely for simplicity of illustration, only two of the receiving stations (23) are exemplified at B(1) and B(2) and will afresh be called first and second receiving stations. Generation of the news items of the particular sequence is indicated at A1. Transmission or distribution of the multicast signal to the receiving stations B (suffixes omitted) is depicted along a first or top row labelled DIS. It will be assumed that the first receiving station B(1) is a failing station mentined before. In other words, the first receiving station B(1) fails to receive some of the news items of the particular sequence as indicated at B(1)1. To the contrary, the second receiving station B(2) correctly or duly receives the news items of the particular sequence with no omission as indicated by B(2)1comp.

Referring to FIGS. 1 and 2, the transmission data of the multicast signal are received by the reception control unit 33 of each of the receiving stations 23 or B as the received data. Included in the received data, the headers are stored in a reception header memory 41 as reception headers. In correspondence to the received data which the first receiving station B(1) fails to receive, some of the headers of the transmission data are lacking as lacking headers among the reception headers stored in the reception header memory 41 of the first receiving station B(1). All the headers of the transmission data are stored As the reception headers in the reception header memory 41 of the second receiving station B(2).

The protocol sequence now proceeds to the reception confirmation depicted in FIG. 2 along a second or middle row labelled CONF. Having stored the reception data and the reception headers, the reception control units 33 of the first and the second receiving stations B send the reception headers as the response signals back to the transmitting station 21 or A as indicated in FIG. 2 at B(1)2 and B(2)2.

The transmission control unit 29 receives the reception headers sent back from the first and the second receiving stations B and reads the memorized headers from the transmission header memory 31. As indicated at A2, the transmission control unit 29 compares and collates the memorized headers with the reception headers received from the first and the second receiving stations B. In the example being illustrated, the transmission control unit 29 finds the lacking header among the reception headers sent back from the first receiving station B(1).

When no lacking header is found, it is said that the reception headers are sent back from a related one of the receiving stations B as a (correct) acknowledgement signal. When at least one lacking header is located, the reception headers are sent back from a concerned one of the receiving stations B as a failure signal. The lacking header indicates the portion which is not received among the multicast signal by the concerned one of the receiving stations B. The concerned one of the receiving stations B is the failing station.

If at least one lacking header is found in this manner besides the reception headers, the protocol sequence proceeds to data retransmission depicted in FIG. 2 along a third or bottom row labelled RET. More particularly, the transmission control unit 29 establishes a relevent one of the communication channels 25 between the transmitting station 21 or A and the failing station, such as B(1), and locates those of the memorized data which are in correspondence to the lacking headers as corresponding data. Through the relevant one of the communication channels 25, the transmission control unit 29 transmits the corresponding data to the failing station as retransmitted data, namely, as the portion of the multicast signal.

Alternatively, the transmission control unit 29 locates a related one of the communication channels 25 through which the failure signal is received. The transmission control unit 29 can-use the related one of the communication channels 25 as the relevant one of the communication channels 25 in transmitting the retransmitted data to the failing station.

Having transmitted the retransmitted data, the transmission control unit 29 again confirms reception of the retransmitted data at the failing station. If the retransmitted data are duly or thoroughly received, the transmission control unit 29 cancels the memorized data and the memorized headers from the transmission data and header memories 31 and 39. The protocol sequence comes to an end. The point-to-multipoint communication network can deal with other sequences of the news items.

If at least one lacking header still remains, the transmission control unit 29 makes the transmission header memory 39 keep the memorized header or headers accordingly together with a station identifier identificatory of the failing station related to the last-mentioned at least one of the lacking headers. The memorized datum or data are kept in the transmission data memory 31 correspondingly. The transmission control unit 29 repeats the data retransmission at a predetermined repetition period until all news items of the particular sequence are correctly received by the receiving stations 23, when the protocol sequence comes to an eventual end.

Reviewing FIGS. 1 and 2, it is now appreciated that the data source 27, the header generator 37, and the transmission control unit 29 collectively serve as a multicast communication arrangement for establishing the communication channels 25 between the transmitting station 21 and the receiving stations 23 and for transmitting the data as the multicast signal to the communication channels 25. A combination of the transmission header memory 36, the transmission control unit 29, the reception control unit 33, and the reception header memory 41 serves as a reception confirming arrangement for confirming reception of the multicast signal by the receiving stations 23 to locate a failing station that fails among the receiving stations 23 to receive at least a portion of the multicast signal. Another combination of the transmission data and header memories 31 and 39, the transmission and the reception control units 29 and 33, and the reception header memory 41 serves as a retransmitting arrangement for establishing one of the communication channels 25 between the transmitting station 31 and the failing station and for transmitting the portion to the last-mentioned one of the communication channels 25.

Figure 3:
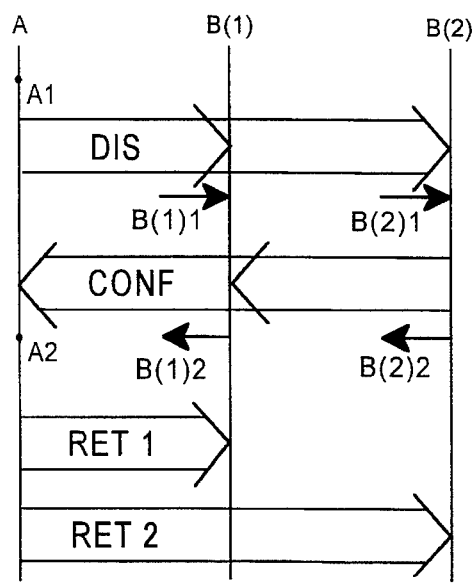
FIG. 3 shows another protocol sequence for use in the point-to-multipoint communication network depicted in FIG. 1.

Turning now to FIG. 3 with FIG. 1 continually referred to, another example of the protocol sequence will be described. The receiving stations 23 are assigned with first through N-th station identifiers, which may be serial station numbers, such as the suffixes enclosed with parentheses in the reference numerals individually indicative of the receiving stations 23.

As response signals, the reception control units 33 of the receiving stations 23 send the station identifiers in addition to the reception headers back to the transmission control unit 29. Each time when a lacking header is found, the transmission control unit 29 stores the station identifier or identifiers in the transmission header memory 39. Referring to the station identifiers stored in the transmission header memory 39, the transmission control unit 29 establishes relevant ones of the communication channels 25.

In FIG. 3, both the first and the second receiving stations B(1) and B(2) fail to receive some of the news items of the particular sequence in the manner indicated at B(1)1 and B(2)1. It is possible in this event to concurrently or collectively retransmit the corresponding data to the relevant ones of the communication channels 25 as indicated along a first or top row in FIG. 3.

Alternatively, it is possible to first retransmit the corresponding data to the first receiving station B(1) alone in the manner depicted along a third row labelled RET1. Having carried out the reception confirmation as described in conjuction with FIG. 2, the transmission control unit 29 retransmits the corresponding data to the second receiving station B(2) in the manner shown along a fourth or bottom row labelled RET2. The corresponding data may differ between the first and the second receiving stations B.

Further turning to FIG. 4 with FIG. 1 continuously referred to, still another example of the protocol sequence will be described. In the manner described in conjunction with FIG. 2, the reception confirmation is carried out first after distribution of the multicast signal and subsequently after each retransmission of the corresponding data. The first reception confirmation is labelled CONF1 along a second row in FIG. 4. During this reception confirmation, the transmission control unit 29 counts the number of failing station or stations and compares the number with a predetermined threshold value which may preliminarily be stored, for example, therein.

Figure 4:
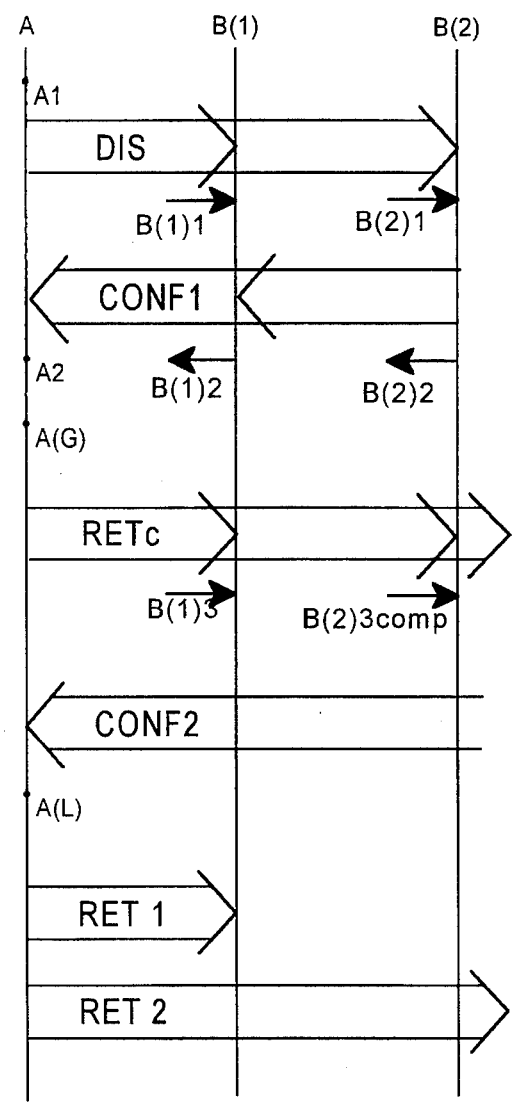
FIG. 4 shows still another protocol sequence for use in the point-to-multipoint communication network illustrated in FIG. 1.

In FIG. 4, it will first be assumed that the number of failing stations is found at A(G) to be greater than the predetermined threshold value. In this event, the transmission control unit 29 transmits the corresponding data concurrently to the relevent ones of the communication channels 25 in the manner depicted along a third row labelled RETc. The transmission control unit 29 again confirms reception of the retransmitted data by the failing stations.

In an ideal case, no failing station will be left. In practice, a small number of failing stations may be found as remaining stations. During the reception confirmation depicted along a fourth row labelled CONF2, the transmission control unit 29 counts the number of remaining stations and finds at A(L) that this number is not greater than the predetermined threshold value.

The transmission control unit 29 may establish at least one of the communication channels 25 between the transmitting station 21 and the remaining station or stations and transmits the corresponding data individually through the last-mentioned at least one of the communication channels 25. In FIG. 4, it is surmised that the remaining stations are two in number and that one of the remaining stations is the first receiving station B(1). Retransmission of the corresponding data to the first receiving station B(1) is depicted along a fifth row labelled RET1. Retransmission of the corresponding data to the other of the remaining stations is depicted along a sixth or bottom row labelled RET2.

It is desirable to predetermine the threshold value in consideration of the probability of presence of the failing stations at the reception confirmation CONF1 and with attention directed to the rate of charge for the multicast service. This will render the point-to-multipoint communication network operable most economically with the retransmission presupposed.

Again referring to FIG. 1, the transmitting station 21 may not comprise the header generator 37 and the transmission header memory 39. Each of the receiving stations 23 need not comprise the reception header memory 41. Under the circumstances, it will be understood from the following that a combination of the transmission control circuit 29, the transmission data memory 31, the reception control unit 33, and the reception data memory 35 serves as the reception confirming arrangement as well as the retransmitting arrangement. The transmission and the reception data memories 31 and 35 should therefore be capable of supplying their contents to the transmission and the reception control units 29 and 33.

Referring to FIG. 5 with FIG. 1 additionally referred to, a different example of the protocol sequence will be described. In FIG. 5, the transmitting station 21 is indicated at A and an arbitrary one of the receiving stations 23, at B. It is presumed that the data are generated at the data source 27 as a sequence of transmission data, each of the transmission data comprising at least a predetermined number of characters, such as at least ten characters.

After start of the protocol sequence at the transmitting station A, the transmission control unit 29 repeatedly checks at a first transmitter step S1 whether or not the transmission data of the sequence are supplied from the data source 27. If supplied with the sequence, the transmission control unit 29 transmits at a second transmitter step S2 the transmission data one by one in the multicast signal to the communication channels 25 depicted in FIG. 5 by an arrowheaded line. Meanwhile, the transmission control unit 29 stores at a third transmitter step S3 such transmission data in the transmission data memory 31 as the memorized data. At a fourth transmitter step S4, the transmission control unit 29 checks whether or not the data of the sequence come to an end.

When the data come to the end at the fourth transmitter step S4, the transmission control unit 29 reads each of the memorized data from the transmission data memory 31. Reading the memorized data, the transmission control unit 29 transmits at a fifth transmitter step S5 the predetermined number of characters of each datum of the transmission data to the communication channels 25.

The protocol sequence starts also in the receiving stations 23. In the receiving station B being illustrated, the reception control unit 33 repeatedly checks at a first receiver step R1 whether or not the transmission data of the sequence are received is the multicast signal through a pertinent one of the communication channels 25 as the received data which are mentioned before and are in correspondence to the transmission data under consideration. At a second receiver step R2, the reception control unit 33 stores the received data in the reception data memory 35 as the reception data. At a third receiver step R3, the reception control unit 33 repeatedly checks whether or not the multicast signal ends.

Having found at the third receiver step R3 that the multicast signal has ended, the reception control unit 33 checks at a fourth receiver step R4 whether or not the predetermined number of characters of each datum of the memorized or the transmission data are received through the pertinent one of the communication channels 25. In the meantime, the reception control unit 33 reads the reception data successively from the reception data memory 35 and compares the predetermined number of characters of each of the reception data read out of the reception data memory 35 with the predetermined number of characters of one of the received data that corresponds to the above-mentioned each of the transmission data.

In this manner, the reception control unit 33 checks at a fifth receiver step R5 whether or not the reception or the received data are coincident with the transmission data which should be received by the receiving station B. If no lacking datum is found, the fifth receiver step R5 returns to the first receiver stap R1. The protocol sequence comes to an end insofar as the receiving station B is concerned.

If a lacking datum is found, the protocol sequence does not end but still continues in the receiving station B. The reception control unit 33 sends as a failure signal a retransmission request signal at a sixth receiver step R6 to the transmitting station A through the pertinent one of the communication channels 25. The request signal preferably indicates the lacking datum by the station identifier mentioned before and by a data identifier which will later be described.

Meanwhile, the protocol sequence still proceeds in the transmitting station A. At a sixth transmitter step S6, the tansmission control unit 29 searches for the retransmission request signal or signals which might be received through the communication channels 25. If no retransmission request signal is received, the sixth transmitter step S6 returns to the first transmitter step S1. The protocol sequence comes to an end insofar as the transmitting station A is concerned.

If at least one retransmission request signal is received, the protocol sequence does not end at the transmitting station A. With reference to the request signal, the transmission control unit 29 reads the corresponding datum or data from the transmission data memory 31 and transmits at a seventh transmitter step S7 such corresponding data one by one either concurrently or individually towards the failing stations. Having transmitted the corresponding data as the retransmitted data in the manner described, the transmission control unit 29 turns the seventh transmitter step S7 back to the sixth transmitter step S6. If no retransmission request signal remains, the sixth transmitter step S6 returns to the first transmitter step S1. The protocol sequence eventually ends at the transmitting station A.

After the sixth receiver step R6, the protocol sequence still continues in such an event in the receiving station B. The reception control unit 33 repeatedly checks at a seventh receiver step R7 whether or not each lacking datum is received through the pertinent one of the comminication channels If the lacking datum is received as a retransmitted datum, the reception control unit 33 rewrites the reception data memory 35 to store at an eighth receiver step R8 the retransmitted datum in the reception data memory D5 either as a renewed one or an additional one of the reception data. If no,,more lacking datum is received at the seventh receiver step R7, the eighth receiver step R8 returns to the first receiver step R1 without rewriting the reception data memory 35. The protocol sequence eventually ends also at the receiving station B.

Reviewing FIGS. 1 and 5, it is understood that the multicast communication arrangement (27, 29) transmits a sequence of transmission data as the multicast signal to the communication channels 25. Each of the transmission data comprises at least a predetermined number of characters. Each of the receiving stations 23 receives the multicast signal through a pertinent one of the communication channels 25 unless each receiving station is the failing station. The received data would correspond to the transmission data.

The reception confirming arrangement (29, 31, 33, 35) is put into operation in the transmitting station 21 or A at the fifth transmitter step S5 and in each receiving station B at the fourth receiver step R4. It should be understood that the received data are stored in the reception data memory 35 as the reception data before the reception confirming arrangement is put into operation.

In the reception confirming arrangement, the transmission control unit 29 transmits the predetermined number of characters of each datum of the transmission or the memorized data to the communication channels 25. In each receiving station B, the reception control unit 33 determines whether or not the predetermined number of characters of the datum in question are coincident with the predetermined number of characters of one of the reception data that corresponds to the datum under consideration.

In short, the reception confirming arrangement carries out character match between the transmission data of the multicast signal and the received data of the multicast signal. If the predetermined number of characters of at least one of the reception data is incoincident with the predetermined number of characters of one of the transmission data that corresponds to one of the reception data under consideration, at least a portion of the multicast signal is neither correctly nor duly received by the receiving station B.

Consequently, the receiving station B is the failing station. In this event, the retransmitting arrangement (29, 31, 33, 35) transmits the portion in question either concurrently or individually to the failing stations.

Referring to FIG. 6 with FIG. 1 continually referred to, a further different example of the protocol sequence will be described, In FIG. 6 and the drawing figures which follow, the transmitting station 21 is indicated at A and an arbitrary one of the receiving stations 23, at B. It should be noted in this connection that like reference symbols, such as S1 and R1, will be used to designate similar steps of the protocol sequence processed separately in the transmitting and the receiving stations A and B merely for simplicity of designation.

In the transmitting station A, the transmission control unit 29 carries out first through fourth transmitter steps S1 to S4 like the first through the fourth transmitter steps S1 to S4 described in conjunction with FIGS. 1 and 5. At a fifth transmitter step S5, the transmission control unit 29 transmits an end command to the communication channels 25 if transmission of the transmission data as the multicast signal fails as a result of a trouble, namely, of system down, in the transmitting station A. When transmission of the multicast signal ends with no failure, an end confirmation command is transmitted to the communication channels 25 at the fifth transmitter step S5.

In the receiving station B, the reception control unit 33 repeatedly searches at a first receiver step R1 for the multicast signal received through a relevant one of the communication channels 25 as the received data in correspondence to the transmission data. When found, the received data are stored in the reception data memory 35 as the reception data. In the meantime, the reception control unit 33 searches at the first receiver step R1 which of the end confirmation command and the end command is received through the relevant one of the communication channels 25. If the end command is received, the protocol sequence is suspended in the receiving station B. Others of the receiving stations 23 will also receive the end command. The protocol sequence is simultaneously put into a similar waiting state in the receiving stations 23.

If the end confirmation command is received at the first receiver step R1, the protocol sequence proceeds in the receiving stations 23. In the receiving station B, the reception control unit 33 checks at a second receiver step R2 whether or not the reception data are kept in the reception data memory 35. It may be mentioned here that such reception data may not directly stored in the reception data memory 35 but may temporarily be stored or buffered in the reception control unit 33. In such an event, the reception control unit 33 searches at the second receiver step R2 whether or not at least one reception datum remains buffered therein. If remaining in the reception control unit 33, the reception data are anew stored in the reception data memory 35 at a third receiver step R3.

When no more data remain in the reception control unit 33 at the second receiver step R2, the reception control unit 33 transits at a fourth receiver step R4 the predetermined number of characters of each datum of the reception data as a command receive signal through the relevant one of the communication channels 25. The command receive signal is preferably accompanied by the station identifier.

The transmission control unit 29 receives such command receive signals through the communication channels 25 and checks at a sixth transmitter step S6 if at least one of the receiving stations 23 is abnormal, namely, is a failing station. For this purpose, the transmission control unit 29 may transmit the predetermined number of characters of each datum of the memorized data to the relevent one of the communication channels 25. If the receiving station B is abnormal, the transmission control unit 29 transmits at a seventh transmitter step S7 the lacking datum to the relevent one of the communication channels 25.

In the receiving station B, the reception control unit 33 carries out the character match at a fifth receiver step R5. If all of the reception data are correct, the fifth receiver step R5 returns to the first receiver step R1. The protocol sequence comes to an end insofar as the receiving station B is concerned.

If the lacking datum or data are retransmitted from the transmitting station A, the protocol sequence still continues in the receiving station B. The reception control unit 33 checks at a sixth receiver step R6 whether or not the lacking datum or data are received. If received, such a lacking datum is stored at a seventh receiver step R7 in the reception data memory 35. When no more lacking datum is received, the seventh receiver step R7 returns to the first receiver step R1. The protocol sequence arrives at an eventual end.

Either when the receiving station B is normal or when the retransmission ends, the transmission control unit 29 checks at an eighth transmitter step S8 whether or not all the receiving stations 23 are tested. If not, the eighth transmitter step S8 returns to the fifth transmitter step S5. If the test is already done in connection with all the receiving stations 23, the eighth transmitter step S8 returns to the first transmitter step S1. The protocol sequence eventually ends also in the transmitting station A.

Referring afresh to FIG. 7 and again to FIG. 1, a still further different example of the protocol sequence will be described. In the transmitting station A, the transmission control unit 29 checks at a first transmitter step S1 whether or not the transmission data of a sequence are received from the data memory 27. When the sequence is not received, the transmission control unit 29 begins at a second transmitter step S2 to measure a predetermined time interval which may be shorter than an average duration of such sequence and may be longer than a shortest duration of the sequences.

To this end, the transmission control unit 29 may comprise a timer (not shown as hardware) for measuring the time interval. While no transmission data are received before the timer times out, namely, before lapse of the time interval, the transmission control unit 29 again searches for appearance of the sequence. In this manner, the transmission control unit 29 repeatedly searches for reception of the sequence.

When the transmission data are received at the first transmitter step S1, at least a portion of the sequence is received until the timer times out. On such portions of the sequence, the transmission control unit 29 repeatedly carries out third through fifth transmitter steps S3 to S5 which are equivalent to the second through the fourth transmitter steps S2 to S4 described with reference to FIGS. 1 and 5. In due course, the transmission control unit 29 finds at the fifth transmitter step S5 an end of the sequence.

Either each time when the timer times out or when the sequence eventually ends the transmission control unit 29 transmits the predetermined number of characters of each datum of the memorized or the transmission data at a sixth transmitter step S6 like at the fifth transmitter step S5 described in connection with FIGS. 1 and 5.

In the receiving station B, the reception control unit 33 carries out first through third receiver steps R1 to R3 which are similar to the first through the third receiver steps S1 to S3 described with reference to FIGS. 1 and 5. If the multicast signal is received at the second receiver step R2 being illustrated, the reception control unit 33 checks at a fourth receiver step S4 presence or absence of the lacking datum. If the lacking datum is found, the reception control unit 33 transmits at a fifth receiver step R5 a retransmission request signal to a relevant one of the communication channels 25. The fourth and the fifth receiver steps R4 and R5 are similar to the fourth through the sixth receiver steps R4 to R6 described in conjuction with FIGS. 1 and 5.

In the transmitting station A, the transmission control unit 29 carries out seventh and eighth transmitter steps S7 and S8 which correspond to the sixth and the seventh trensmitter steps S6 and S7 described in conjunction with FIGS. 1 and 6. In FIG. 7, the transmission control unit 29 subsequently renews at a ninth transmitter step S9 a list which may be called a still remaining list and shows the memorized datum or data still kept without deletion in the transmission data memory 31 together with the station identifier or identifiers and the data identifier or identifiers in correspondence to at least one still remaining lacking datum.

In the receiving station B, the reception control unit 33 carries out in the meantime sixth and seventh receiver steps R6 and R7 which are similar to the seventh and the eighth receiver steps R7 and R8 described with reference to FIGS. 1 and 5. In the transmitting station A, the transmission control unit 29 carries out a tenth transmitter step SiO like the ninth transmitter step S8 described in connection with FIGS. 1 and 5.

Referring anew to FIG. 8 and once more to FIG. 1, a yet farther different example of the protocol sequence will be described. In the transmitting station A, the transmission control unit 29 carries out first through fifth transmitter steps S1 to S5 like the first through the fifth transmitter steps S1 to S5 described with reference to FIGS. 1 and 7. At the third transmitter step S3, the transmission data of either a whole sequence or a portion of the sequence are transmitted as the multicast signal to the communication channels 25. At a sixth transmitter step S6, the transmission control unit 29 transmits either an end command or an end confirmation command to the communication channels 25 like at the fifth transmitter step S5 described in conjuction with FIGS. 1 and 6.

In the receiving station B, the reception control unit 33 carries out first through fourth receiver steps R1 to R4 which are equivalent to the first through the fourth receiver steps R1 to R4 described in connection with FIGS. 1 and 5. At the fourth receiver step R4 being illustrated, the reception control unit 33 supplies a relevant one of the communication channels 25 with a response signal indicative of whether or not the reception data are stored in the reception data memory 33 in a normal state or in an abnormal state.

In the transmitting station A, the transmission control unit 29 carries out seventh through ninth transmitter steps S7 to S9 like the sixth through the eighth transmitter steps S6 to S8 described in connection with FIGS. 1 and 6. In the receiving station B, the reception control unit 33 carries out fifth through seventh receiver staps R5 to R7 which are similar to the fifth through the seventh receiver steps R5 to R7 described in connection with FIGS. 1 and 6.

Reviewing FIGS. 5 through 8 with FIG. 1 additionally referred to, the transmitting station 21 or A collectively or centrally administrates the receiving stations 23. More particularly, the transmission control unit 29 transmits during the reception confirmation a predetermined number of characters of each datum of the transmission data to the receiving stations 23 for the character match at each receiving station B with the predetermined number of characters of one of the received or the reception data. In contrast, it is possible to make the transmitting station 21 or A individually or discretely administrate the receiving stations 23 in the manner which will be described in the following. In accordance with this individual administration, each receiving station B checks whether or not the transmission data of the multicast signal are correctly or duly received with no failure or with no lacking datum.

Figure 9A:
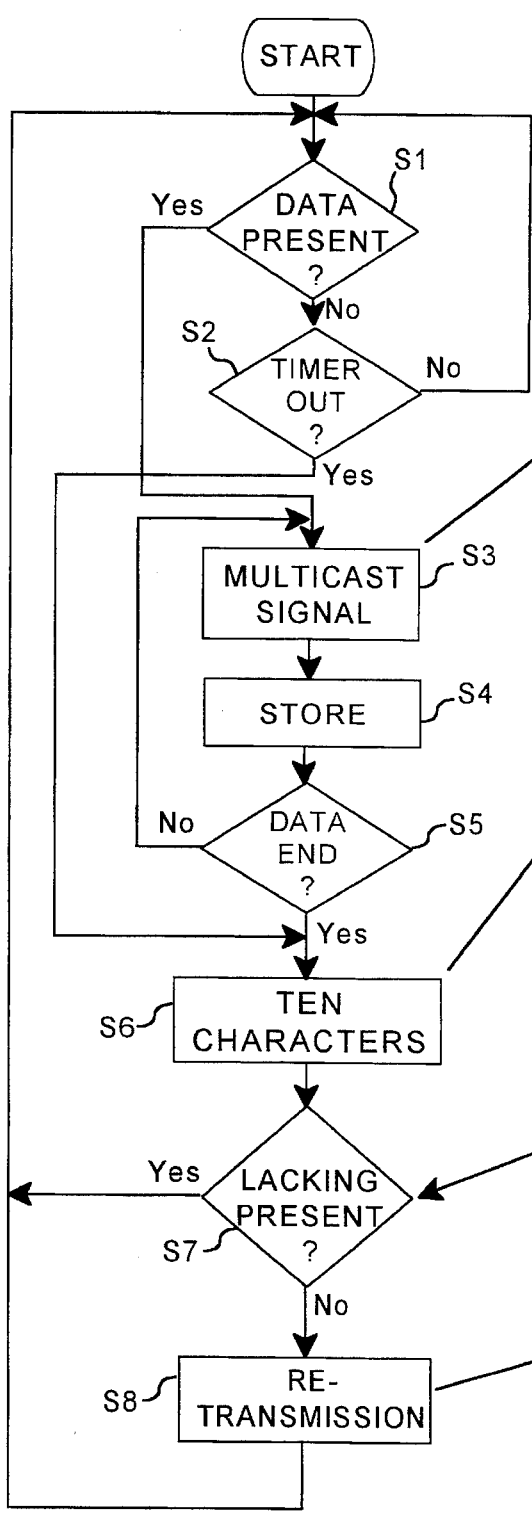
FIG. 9 (comprising FIGS. 9A and 9B) shows a different flow chart for use in describing operation of the point-to-multipoint communication network shown in FIG. 1.
Figure 9B:
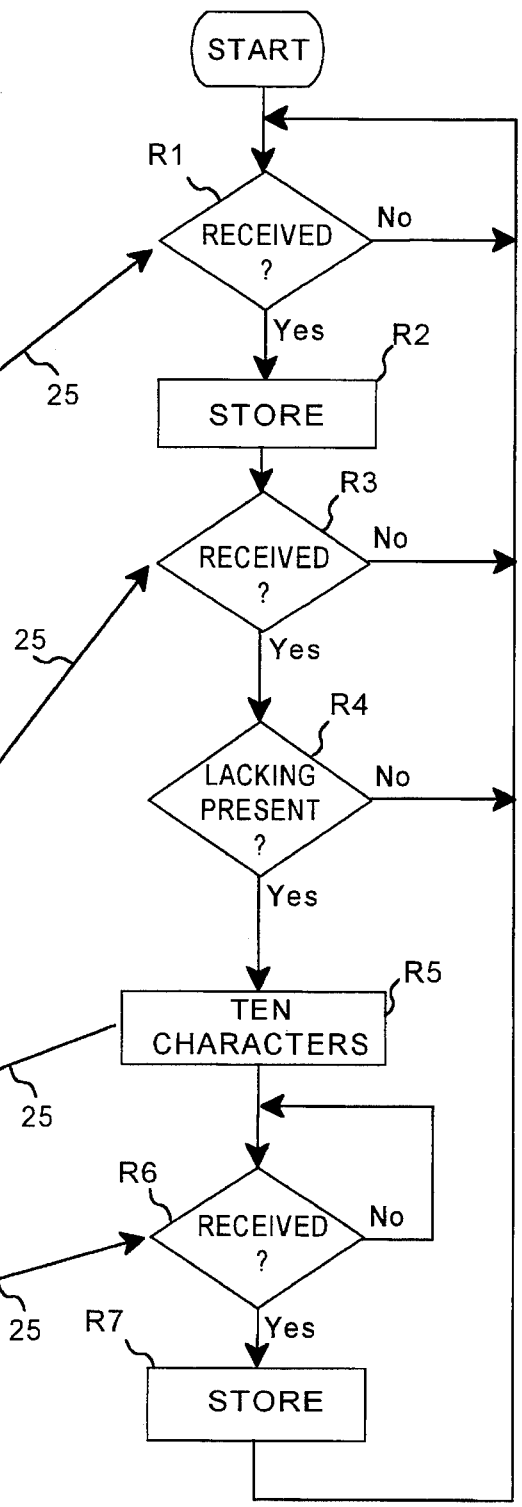

Referring now to FIG. 9 with FIG. 1 continuously referred to, an additionally different example of the protocol sequence will be described. In the transmitting station A, the transmission control unit 29 carries out first through fifth transmitter steps S1 to S5 which are equivalents of the first through the fifth transmitter steps S1 to S5 described with reference to FIGS. 1 and 7. In the third transmitter step S3, the transmission data of a sequence are transmitted to the communication channels 25 as the multicast signal. It shoued be noted in this connection that a certain one of the transmission data is transmitted in the multicast signal as a last datum.

At a sixth transmitter step S6, the transmission control unit 29 transmits the predetermined number of characters of the last datum to the communication channels 25. In the receiving station B, the reception control unit 33 repeatedly checks at a first receiver step R1 whether or not the transmission data of the multicast signal are received through a pertinent one of the communication channels 25 as the received data. If the multicast signal is received, the reception control unit 33 stores at a second receiver step R2 the received data in the reception data memory 35 as the reception data.

The reception control unit 33 checks at a third receiver step R3 whether or not the predetermined number of characters are received through the pertinent one of the communication channels 25. If such characters are not received, the third receiver step R3 returns to the first receiver step R1.

If the characters are received, the reception control unit 33 checks at a fourth receiver stap R4 presence or absence of a lacking datum by checking whether or not correct matching is possible between the predetermined number of characters received through the pertinent one of the communication channels 25 and the predetermined number of characters of one of the received data that is received and stored in the reception data memory 35 latest as a latest datum. If the correct matching is impossible, it is understood that at least the last datum is not received in the multicast signal.

If the correct matching is possible, no lacking datum is present. In this event, the protocol sequence comes to an end insofar as the receiving station B is concerned. The fourth receiver step R4 returns to the first receiver step R1. If at least one lacking datum is present, the protocol sequence does not yet end bus is still in progress.

The reception control unit 33 transmits at a fifth receiver step R5 a retransmission request signal as the response signal to the pertinent one of the communication channels 25. The request signal represents, together with the station identifier of the receiving station B under consideration, the predetermined number of characters of the latest datum.

In the transmitting station A, the transmission control unit 29 checks at a seventh transmitter step S7 whether or not such request signals are received through the communication channels 25. If no request signal is received, the protocol sequence comes to an end as regards the transmitting station A. The seventh transmitter step S7 returns to the first transmitter step S1. If at least one request signal is received through one of the communication channels 25, the protocol sequence does not yet come to the end but still continues.

In this event, the transmission control unit 29 individually deals with the request signal or signals. In the example being illustrated, the transmission control unit 29 receives the request signal through the pertinent one of the communication channels 25. With reference to the predetermined number of characters of the latest datum received through the pertinent one of the communication channels 25, the transmission control unit 29 searches at the seventh transmitter step S7 for one of the memorized data that comprises as a particular datum the predetermined number of characters received through the pertinent one of the communication channels 25. It is now understood that the lacking datum or data begin in the transmission data memory 31 at one of the memorized data that next follows the particular datum.

The transmission control unit 29 therefore supplies at an eighth transmitter step S8 the pertinent one of the communication channels 25 as at least one corresponding datum with at least one of the memorized data that immediately follows the particular datum. In the receiving station B, the reception control unit 33 repeatedly searches at a sixth receiver step R6 for such a retransmitted datum. If received, the retransmitted datum or data are stored at a seventh receiver step R7 in the reception data memory 35.

It will be surmised merely for brevity of the description that the lacking datum no more remains with respect to the receiving stations 23. The protocol sequence comes to an eventual end as regerds the transmitting station 21 or A and the receiving stations 23. The eighth transmitter step S8 returns to the first transmitter step S1. As soon as the protocol sequence eventually ends in the receiving station B, the seventh receiver step R7 returns to the first receiver step R1.

Figure 10A:
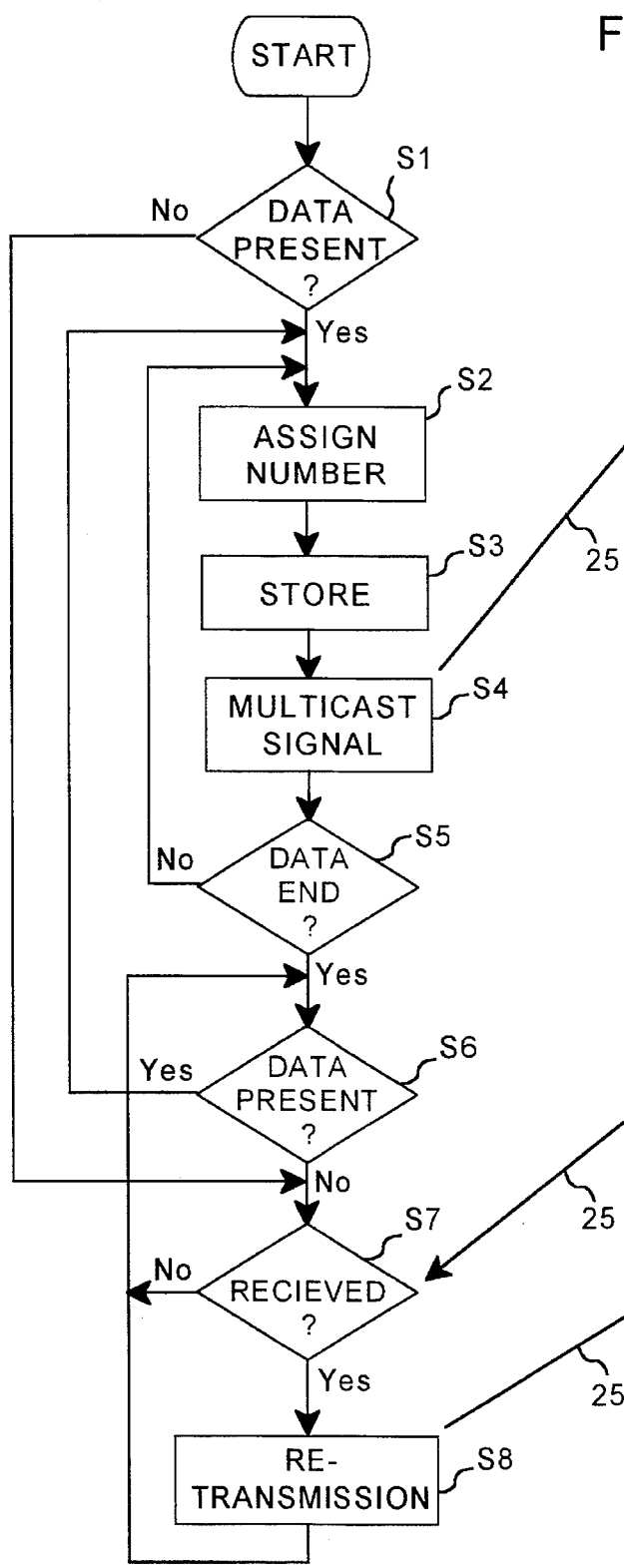
FIG. 10 (comprising FIGS. 10A and 10B) shows a further different flow chart for use in describing operation of the point-to-multipoint communication network illustrated in FIG. 1.
Figure 10B:
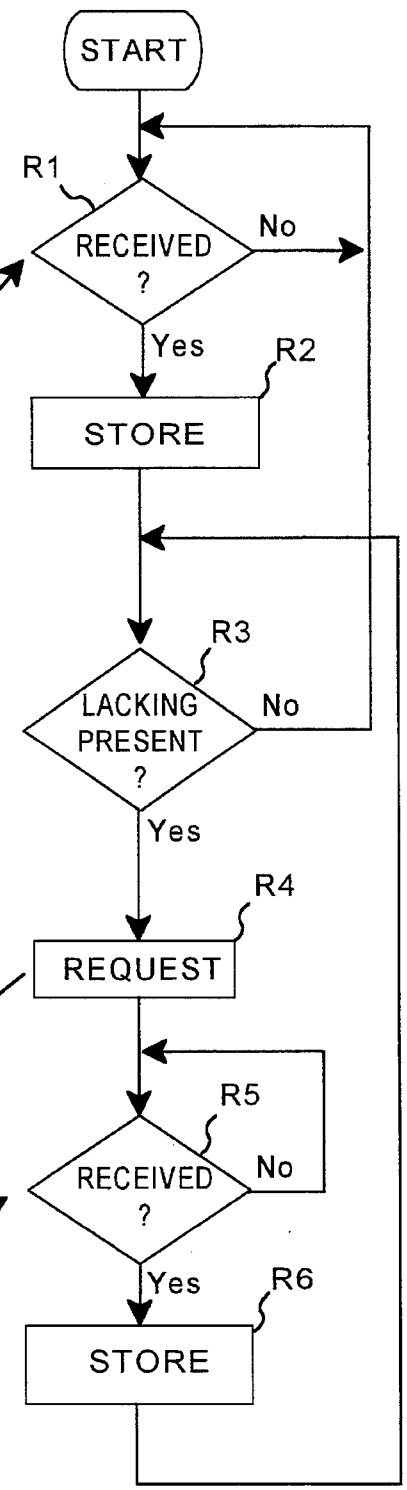

Referring to FIG. 10 with FIG. 1 continuously referred to, another additionally different example of the protocol sequence will be described. In the transmitting station A, the transmission control unit 29 repeatedly checks at a first transmitter step S1 whether or not the data of a sequence are received from the data source 27. Being received as the sequence, the data will now be called sequential data.

If the sequence is received, the transmission control unit 29 assigns or gives at a second transmitter step S2 systematic numbers to the sequential data. For this purpose, the transmission control unit 29 may include a number assigning circuit, such as the header generator 37. Assigned with the systematic numbers, the sequential data will be referred to as the transmission data. It is possible to understand that the number assigning circuit is included in the reception confirming arrangement.

At a third transmitter step S3, the transmission control unit 29 stores the transmission data in the transmission data memory 31 as the memorized data. In the meantime, the transmission control unit 29 transmits at a fourth transmitter step S4 the transmission data as the multicast signal to the communication channels 25.

At a fifth transmitter step S5, the transmission control unit 29 checks whether or not the transmission data are still present and are supplied thereto. If the transmission data are present, the fifth transmitter step S5 returns to the second transmitter step S2. If no more supplied with the transmission data, the transmission control unit 29 confirms at a sixth transmitter step S6 that the transmission data are no more present. If the transmission data are present, the sixth transmitter step S6 returns to the second transmitter step S2.

In the receiving station B, the reception control unit 33 carries out first and second receiver steps R1 and R2 which are similar to the first and the second receiver steps R1 and R2 described with reference to FIGS. 1 and 5. At a third receiver step R3, the reception control unit 33 searches for the lacking datum. To this end, the reception control unit 33 comprises a number checking circuit. It is possible to understand that the number checking circuit is depicted as software by a rectangle designated by the reference symbol R3 and that the number checking circuit is included in the reception confirming arrangement.

With reference to a rule for generating the systematic numbers, the reception control unit 33 checks whether or not the received data are received correctly or duly with the systematic numbers. If the received data are not accompanies by the numbers which do not follow the rule, the third receiver step R3 determines that the multicast signal is received through a relevant one of the communication channels 25 with at least one lacking datum and that the receiving station B is a failing station. If no lacking datum is found the protocol sequence comes to an end insofar as the receiving station B is concerned. The third receiver step R3 returns to the first receiver step R1.

If at least one lacking datum is found, the protocol sequence does not end but is still under progress. The reception control unit 33 transmits at a fourth receiver step R4 as the response signal a retransmission request signal to the relevant one of the communication channels 25. The request signal may indicate the station identifier of the receiving station B under consideration and one of the systematic numbers that would be assigned to the lacking datum according to the rule and may be referred to a failure number.

In the transmitting station A, the transmission control unit 29 searches at a seventh transmitter step S7 for such request signals which may be received through the communication channels 25. In the example being illustrated, the request signal is received through the relevant one of the communication channels 25. The transmission control unit 29 reads from the transmission data memory 31 one of the memorized data that is given the failure number and retransmits at an eighth transmitter step S8 as a retransmitted datum the last-mentioned one of the memorized data to the relevant one of the communication channels 25.

In the receiving station B, the reception control unit 33 searches at a fifth receiver step R5 for the retransmitted datum. If received, the retransmitted datum is stored at a sixth receiver step R6 in the reception data memory 35. The sixth receiver step R6 returns to the third receiver step R3.

The reception control unit 33 again searches at the third receiver step R3 for a different lacking datum. If no lacking datum is located by the reception control units 33 of the receiving stations 23, the protocol sequence comes to an eventual end both in the transmitting station 21 or A and in the receiving stations 23. The eighth transmitter step S8 returns to the first transmitter step S1. As soon as the protocol sequence eventually ends in the receiving station B, the third receiver step R3 returns to the first receiver step R1.

Figure 11A:
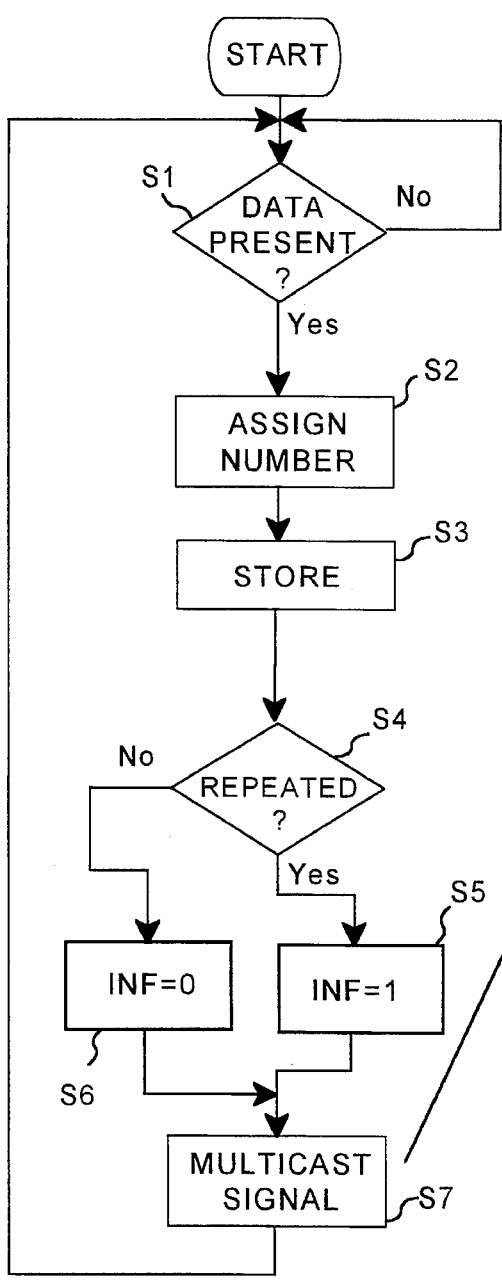
FIG. 11 (comprising FIGS. 11A and 11B) shows a still further different flow chart for use in describing operation of the point-to-multipoint communication network depicted in FIG. 1.
Figure 11B:
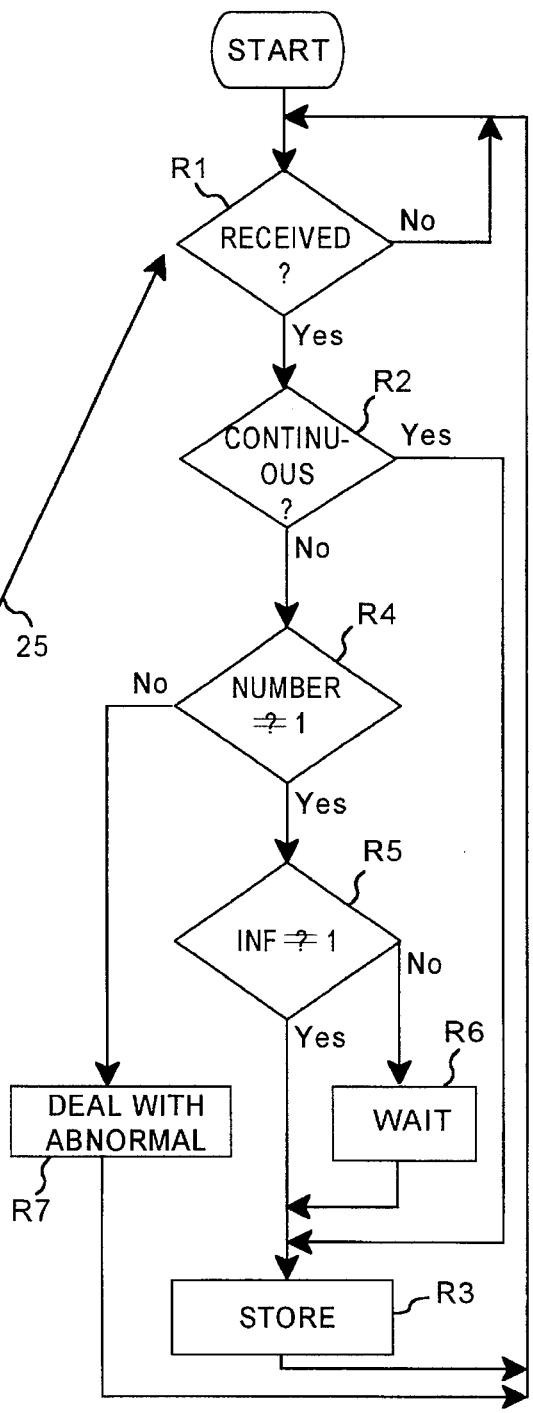

Referring to FIG. 11 with FIG. 1 continually referred to, a still another additionally different example of the protocol sequence will be described. In the transmitting station A, the transmission control unit 29 carries out first through third transmitter steps S1 to S3 which are equivalents of the first through the third transmitter steps S1 to S3 described in connection with FIGS. 1 and 10.

It should be noted in this connection that the systematic numbers should be repeatedly useable. For example, the systematic numbers are given by a serial number which starts at an initial value and increases one by one up to a predetermined maximum. The initial value may be equal to 1 and the predetermined maximum, equal to 10,000. Having arrived at the predetermined maximum, the serial number returns to the initial value. In this manner, the serial number cyclically increases from the initial value up to the predetermined maximum. In other words, the rule of generation of the systematic numbers is a cyclic and one-by-one increase of an integer from the initial value to the predetermined maximum.

It should furthermore be noted that the number assigning circuit may erroneously be reset, as by system down, to count the serial number from the initial value before the predetermined maximum is reached. Consequently, the transmission control unit 29 checks at a fourth transmitter step S4 whether or not the systematic numbers are correctly repeated.

If the rule is correctly applied to the systematic numbers, the transmission control unit 29 gives at a fifth transmitter step S5 a binary one value to an information bit INF when the serial number is given the initial value. If the rule is incorrectly applied, the transmission control unit 29 gives at a sixth transmitter step S6 a binary zero value to the information bit INF when the number assigning circuit is erroneouly reset to give the initial value to the serial number.

In this manner, the information bit is used only together with the serial number indicative of the initial value. Under other circumstances, only the systematic numbers may be used in combination with the sequential data. The sequential data with the systematic numbers and additioally with the information bit will now be referred to as the transmission data.

At a seventh transmitter step S7, the transmission control unit 29 transmits the transmission data as the multicast signal to the communication channels 25. The seventh transmitter step S7 returns to the first transmitter step S1.

In the receiving station B, the reception control unit 33 repeatedly searches for the multicast signal at a first receiver step R1. When the multicast signal is received through a pertinent one of the communication channels 25 as a sequence of received data, the reception control unit 33 checks at a second receiver step R2 whether or not the systematic numbers vary in the received data in correct accordance with the rule of generation of the systematic numbers.

If the rule is correctly applied to the received data, the reception control unit 33 stores at a third receiver step R3 the received data in the reception data memory 35 as the reception data. The third receiver step R3 returns to the first receiver step R1. The protocol sequence comes to an end insofar as the receiving station B is concerned.

If application of the rule is incorrect, the reception control unit 33 individually checks at a fourth receiver step R4 whether or not each of the received data is a particular datum that is given one of the systematic numbers with the initial value. If the received datum under consideration is the particular datum, the reception control unit 33 checks at a fifth receiver step R5 whether or not the information bit INF is given the binary one value in the particular datum. If the information bit represents the binary one value, the fifth receiver step R5 proceeds to the third receiver step R3.

If the information bit does not represent the binary one value, the reception control unit 33 waits at a sixth receiver step R6 for another particular datum with the information bit given the binary one value. If such a particular datum appeaers in due course, the sixth receiver step R6 proceeds to the third receiver step R3.

In general, the serial number does not represent the initial value at the fourth receiver step R4. In such an event, the reception control unit 33 deals with an abnormal state at a seventh receiver step R7 as by transmitting a retransmission request signal to the pertinent one of the communication channels 25. Alternatively, the reception control unit 33 may deal with such an abnormal state immediately when the systematic numbers do not follow the rule at the fourth receiver step R4. In any event, such a "seventh" receiver step S7 returns to the first receiver step R1.

Figure 12A:
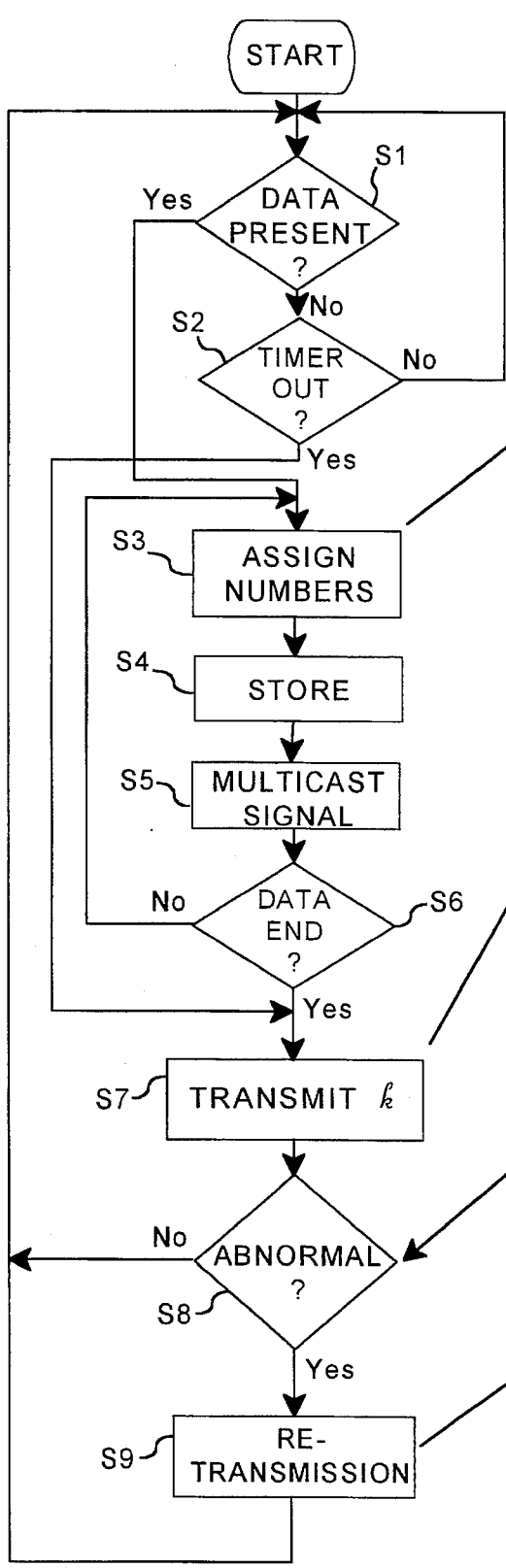
FIG. 12 (comprising FIGS. 12A and 12B) shows a yet further different flow chart for use in describing operation of the point-to-multipoint communication network depicted in FIG. 1.
Figure 12B:
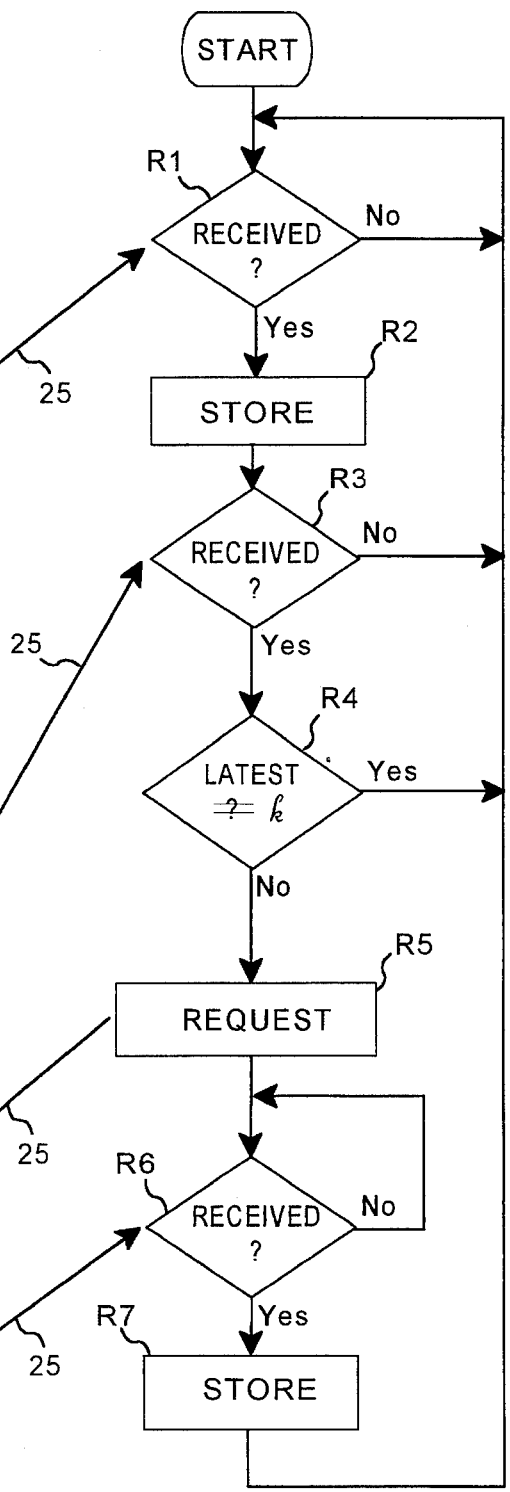
Figure 13A:
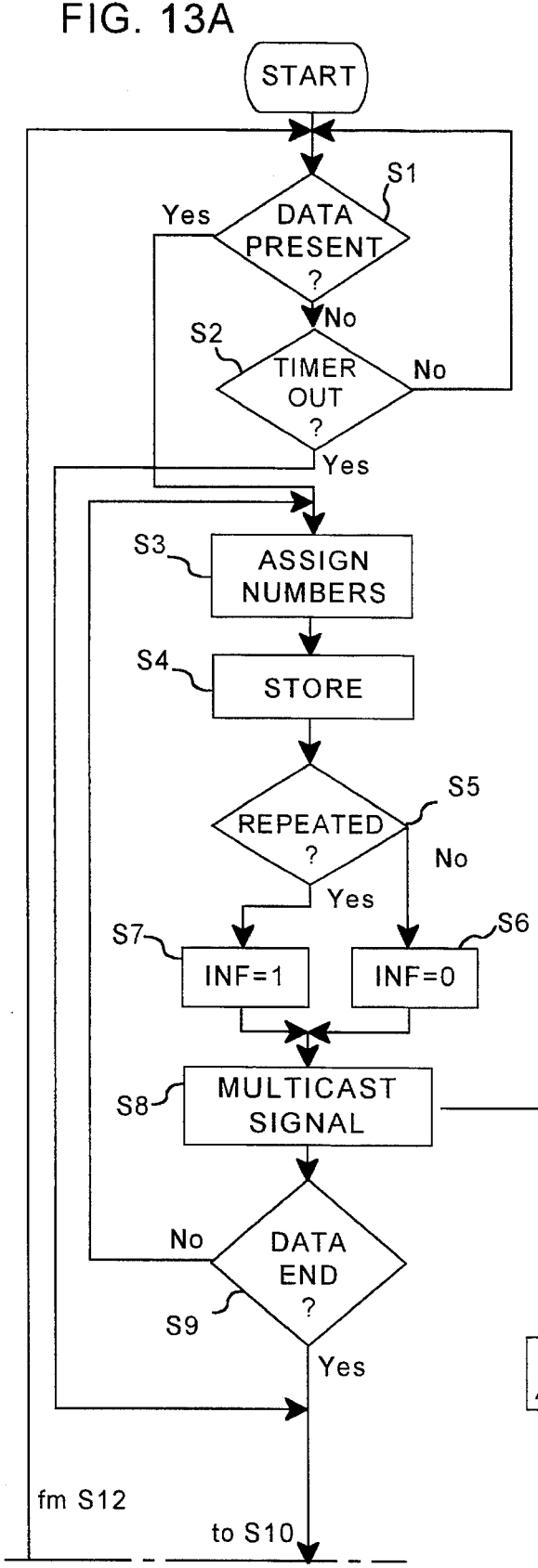
FIG. 13, drawn on two sheets as FIGS. (comprising FIGS. 13A and 13B and 13C) shows an additionally different flow chart for use in describing operation of the point-to-multipoint communication network depicted in FIG. 1.
Figure 13B:
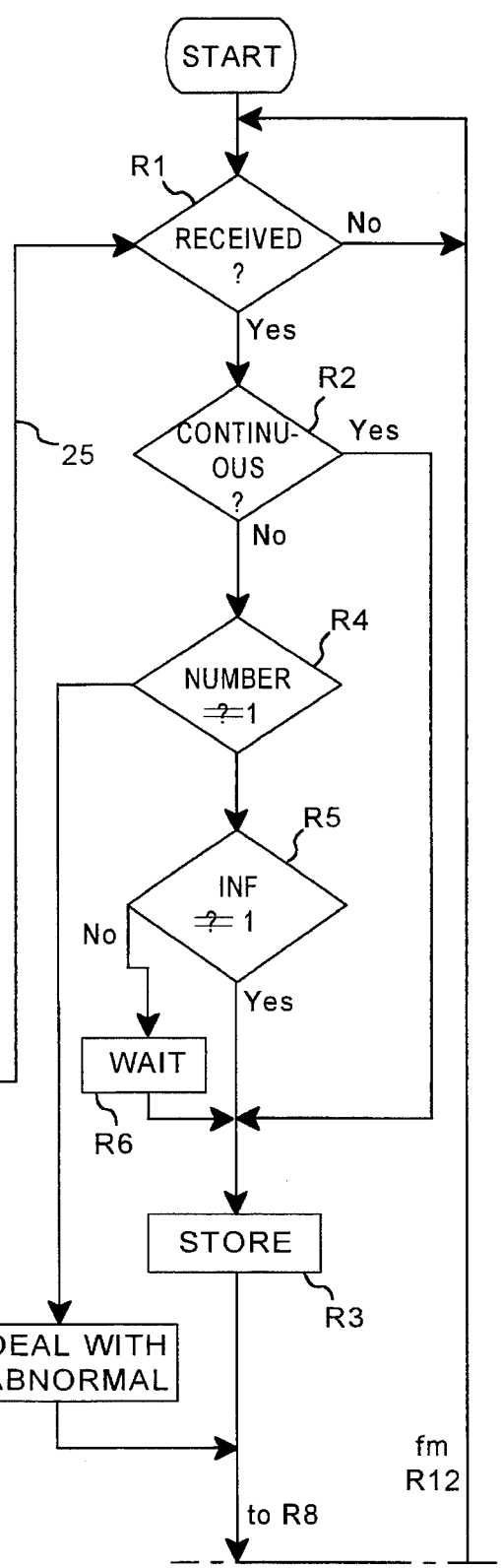
Figure 13C:
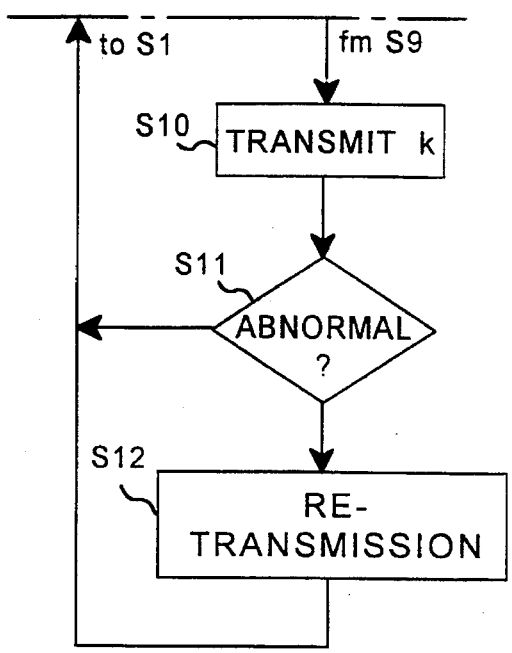
Figure 13D:
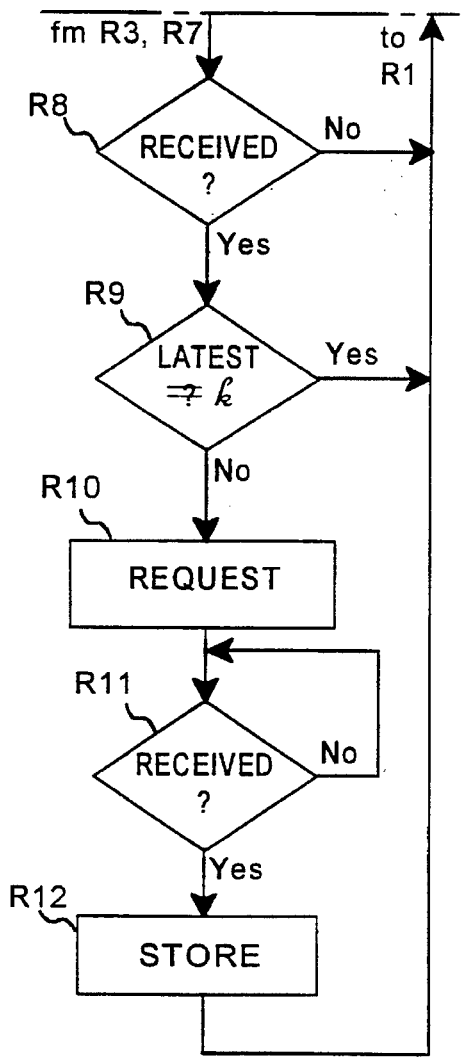

Referring afresh to FIG. 12 with FIG. 1 again referred to, a yet another additionally different example of the protocol sequence will be described. In the transmitting station A, the transmission control unit 29 carries out first and second transmitter steps S1 and S2 which are similar to the first and the second transmitter steps S1 and S2 described in conjunction with FIGS. 1 and 7. Third through sixth transmitter steps S3 to S6 are carried out like the second through the fifth transmitter steps S2 to S5 described with reference to FIGS. 1 and 10. At a seventh transmitter step S7, the transmission control unit 29 transmits to the communication channels 25 a last number k that is assigned to the last datum mentioned in connection with FIG. 9.

In the receiving station B, the reception control unit 33 carries out first and second receiver steps R1 and R2 which are equivalent to the first and the second receiver steps R1 and R2 described with reference to FIGS. 1 and 10. At a third receiver step R3, the reception control unit 33 searches for the last number k received through a pertinent one of the communication channels 25.

If the last number is not received, the third receiver step R3 returns to the first receiver step R1. When the last number is received, the reception control unit 33 reads from the reception data memory 35 a latest number that is assigned to the latest datum described in conjunction with FIG. 9. The reception control unit 33 compares at a fourth receiver step R4 the latest number with the last number k.

If the latest number coincides with the last number, reception of the multicast signal is correct. The protocol sequence comes to an end insofar as the receiving station B is concerned. The fourth receiver step R4 returns to the first receiver step R1.

If the latest number is not equal to the last number, the reception is incorrect. The reception control unit 33 supplies at a fifth receiver step R5 the pertinent one of the communication channels 25 with a retransmission request signal together with the station identifier of the receiving station B and furthermore with the latest number.

In the transmitting station A, the transmission control unit 29 checks at an eighth transmitter step S8 whether or not such request signals are received through the communication channels 25. In the example being illustrated, the request signal is received through the pertinent one of the communication channels 25. Consequently, the transmission control unit 29 carries out a ninth transmitter step S9 like the eighth transmitter step S8 described in connection with FIGS. 1 and 9.

When the request signals are all dealt with, the protocol sequence eventually ends as regards the transmitting station A. The ninth transmitter step S9 returns to the first transmitter step S1.

At the receiving station B, the reception control unit 33 carries out sixth and seventh receiver steps R6 and R7 in the manner described as the seventh and the eighth receiver steps R7 and R8 in conjuction with FIGS. 1 and 5. The protocol sequence comes to an eventual end also in connection with the receiving station B. The seventh receiver step R7 returns to the first receiver step R1.

Referring anew to FIG. 13 with FIG. 1 once again referred to, a finally additional example of the protocol sequence will be described. In the transmitting station A, the transmission control unit 29 carries out first through fourth transmitter steps S1 to S4 like the first through the fourth transmitter steps S1 to S4 described in conjunction with FIGS. 1 and 12. Fifth through eighth transmitter steps S5 to S8 are carried out in the manner described with reference to FIGS. 1 and 11. A ninth transmitter step S9 is similar to the sixth transmitter step S6 described in connection with FIGS. 1 and 12.

In the receiving sation B, the reception control unit 33 carries out first through seventh receiver steps R1 to R7 like the first through the seventh receiver steps R1 to R7 which are described with reference to FIGS. 1 and 11. In the transmitting station 11, the transmission control unit 29 carries out a tenth transmitter step S10 which is identical with the seventh transmitter step S7 described in conjunction with FIGS. 1 and 12. In the receiving station B, first through tenth receiver steps R1 to R10 are similar to the third through the fifth receiver steps R3 to R5 described in connection with FIGS. 1 and 12.

In the transmitting station A, eleventh end twelfth transmitter steps S11 and S12 are equivalents of the eighth and the ninth transmitter steps S8 and S9 desribed in conjuction with FIGS. 1 and 12. In the receiving station B, eleventh and twelfth receiver steps R11 and R12 are carried out in the manner described as the sixth and the seventh receiver steps R6 and R7 with reference to FIGS. 1 and 12.

While this invention has thus far been described in specific conjunction with a single preferred embodiment thereof, a few modifications, and various manners of putting the point-to-multipoint communication network of the embodiment into operation, it will now be readily possible for one skilled in the art to put this invention into practice in various other manners. For example, it is possible to make the point-to-multipoint communication network comprise a plurality of transmitting stations. In this event, it should be understood that each of the transmitting stations is depicted in FIG. 1 as the transmitting station 21. It is furthermore possible to implement the communication channels 25 by using a single frequency included in the frequency band. The single frequency may be used in accordance with the time division known in the art. Alternatively, it is possible to use the single frequency by assigning addresses to the receiving stations 23. The addresses may be the station identifiers and are used as destination addresses on transmitting the multicast signal or other signals from the transmitting station 21 and as source addresses on receiving the response signals at the transmitting station 21 from the receiving stations 23.

What is claimed is:

1. A point-to-multipoint communication network including a transmitting station, a plurality of receiving stations, and multicast communication means for establishing communication channels between said transmitting station and said receiving stations and for transmitting a multicast signal over said communication channels, wherein said point-to-multipoint communication network comprises:

reception confirming means for confirming reception of said multicast signal by said receiving stations to locate a failing station that fails among said receiving stations to receive at least a portion of said multicast signal; and retransmitting means for selecting one of said communication channels between said transmitting station and aid failing station and for transmitting said portion over said one of the communication channels;

said reception confirming means locating a plurality of failing stations that fail among said receiving stations to receive at least portions of said multicast signal, said reception confirming means counting the number of said failing stations and comparing said number with a predetermined threshold value;

said retransmitting means selecting relevant ones of said communication channels between said transmitting station and said failing stations and transmitting said portions concurrently to said relevant ones of the communication channels when said number is greater than said threshold value, said retransmitting means transmitting said portions separately over said relevant ones of the communication channels when said number is not greater than said threshold value.

* * * * *